(12) United States Patent
Kumar (10) Patent No.: US 8,234,173 B1
(45) Date of Patent: Jul. 31, 2012

(54) PRODUCT LIFE CYCLE MAINTENANCE

(75) Inventor: Arun Kumar, Bangalore (IN)

(73) Assignee: Intuit Inc., Mountain View, CA (US)

( * ) Notice: Subject to any disclaimer, the term of this patent is extended or adjusted under 35 U.S.C. 154(b) by 387 days.

(21) Appl. No.: 12/571,277

(22) Filed: Sep. 30, 2009

(51) Int. Cl.
*G06Q 20/00* (2012.01)
(52) U.S. Cl. .......................................................... 705/18
(58) Field of Classification Search ....................... 705/18
See application file for complete search history.

(56) References Cited

U.S. PATENT DOCUMENTS

2006/0212357 A1* 9/2006 White et al. .................... 705/18

OTHER PUBLICATIONS

HP puts the net pedal to the metal, Dix, John. Network World v26n28 pp. 16-17 Sep. 14, 2009.*

* cited by examiner

*Primary Examiner* — Russell S Glass
(74) *Attorney, Agent, or Firm* — Osha Liang LLP (57) ABSTRACT

A method for product life cycle maintenance involves receiving warranty information associated with a first product from a first vendor of a multitude of vendors and receiving warranty information associated with a second product purchased by the customer from a second vendor of the multitude of vendors. The method also involves storing, by a computer processor, the warranty information associated with the first product to a customer account associated with the customer and a first vendor account associated with the first vendor, storing, by a computer processor, the warranty information associated with the second product to the customer account and a second vendor account associated with the second vendor, receiving a request to access warranty information, and providing warranty information pursuant to the request.

20 Claims, 6 Drawing Sheets

PRODUCT LIFE CYCLE MAINTENANCE

BACKGROUND

Many products and/or services sold today come with warranties or the expectation that, at some point during the products life, repairs or service will be necessary. Typically, to receive warranty coverage (and thus free or discounted repairs or replacement), a consumer must prove when the item was purchased and that the warranty remains in effect for the item purchased. Proof usually requires the consumer to present the original receipt or some other form of documentation. Accordingly, the consumer must save such information and be able to find the information at the appropriate time. Frequently, the necessary information is misplaced, lost, or forgotten.

Vendors of products or services do not typically save the necessary proof for each consumer during the time period of the warranty. Further, maintaining such records would distract the vendor from generating revenues from sales of the products or services to new consumers. However, without the necessary warranty information, warranties cannot be honored by vendors authorized to repair or replace the product or service. In such cases, the consumer may find another (non-authorized) vendor who will perform the repair and/or replacement that would have been covered by the warranty for less money. The result is that the authorized vendor fails to receive the additional revenue.

SUMMARY

In general, in one aspect, the invention relates to method for product life cycle maintenance involves receiving warranty information associated with a first product from a first vendor of a multitude of vendors, where the first product is purchased by a customer, and the warranty information is received from the first vendor and is sufficient to file a claim, and receiving warranty information associated with a second product purchased by the customer from a second vendor of the multitude of vendors, where the warranty information is received from the second vendor and is sufficient to file a claim. The method also involves storing, by a computer processor, the warranty information associated with the first product to a customer account associated with the customer and a first vendor account associated with the first vendor, storing, by a computer processor, the warranty information associated with the second product to the customer account and a second vendor account associated with the second vendor, receiving a request to access warranty information, where the request from the customer is restricted to warranty information associated with the first product and second product using the customer account, where the request from the first vendor is restricted to warranty information associated with the first product using the first vendor account, and where the request from the second vendor is restricted to warranty information associated with the second product using the second vendor account, and providing warranty information pursuant to the request.

In general, in one aspect, the invention relates to a computer readable storage medium encoded with instructions for product life cycle maintenance, the instructions include functionality to receive warranty information associated with a first product from a first vendor of a multitude of vendors, where the first product is purchased by a customer, and the warranty information is received from the first vendor and is sufficient to file a claim, and receive warranty information associated with a second product purchased by the customer from a second vendor of the multitude of vendors, where the warranty information is received from the second vendor and is sufficient to file a claim, store, by a computer processor, the warranty information associated with the first product to a customer account associated with the customer and a first vendor account associated with the first vendor, store, by a computer processor, the warranty information associated with the second product to the customer account and a second vendor account associated with the second vendor, receive a request to access warranty information, where the request from the customer is restricted to warranty information associated with the first product and second product using the customer account, where the request from the first vendor is restricted to warranty information associated with the first product using the first vendor account, and where the request from the second vendor is restricted to warranty information associated with the second product using the second vendor account, and provide warranty information pursuant to the request.

In general, in one aspect, the invention relates to a computer system for product life cycle maintenance including a computer processor, a data repository communicatively connected to a vendor module and a customer module and is configured to store data received from the modules, and a memory, operatively connected to the computer processor, and storing instructions for executing on the computer processor. The instructions executing on the computer processor perform at least the following steps: receiving warranty information associated with a first product from a first vendor of a multitude of vendors, where the first product is purchased by a customer, and the warranty information is received from the first vendor and is sufficient to file a claim and receiving warranty information associated with a second product purchased by the customer from a second vendor of the multitude of vendors, where the warranty information is received from the second vendor and is sufficient to file a claim, storing, by a computer processor, the warranty information associated with the first product to a customer account associated with the customer and a first vendor account associated with the first vendor, storing, by a computer processor, the warranty information associated with the second product to the customer account and a second vendor account associated with the second vendor, receiving a request to access warranty information, where the request from the customer is restricted to warranty information associated with the first product and second product using the customer account, where the request from the first vendor is restricted to warranty information associated with the first product using the first vendor account, and where the request from the second vendor is restricted to warranty information associated with the second product using the second vendor account, and providing warranty information pursuant to the request.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a computer system, computer readable storage medium, and method for maintaining the life cycle of a purchased product. Specifically, in one or more embodiments of the invention, vendors and clients register accounts. Then, when a product is purchased, all information associated with the product is added to both the vendor's account who sold the product and the customer's account who bought the product. The product information may then be viewed at anytime by either party by accessing their respective account(s). In one or more embodiments of the invention, reminders or notifications may be sent of upcoming service dates (or other events). In one or more embodiments of the invention, a report may be generated which is made of aggregated data pertaining to any piece or pieces of information stored within the vendor or customer accounts.

As used throughout this detailed description, a product may be any item (e.g., computer, cell phone, car, couch, chair, silverware, etc.) or service (e.g., service agreements, third party warranties, contractual obligations, cleaning services, or any other service, etc.). It will be apparent to one of ordinary skill in the art that anything that a consumer may purchase is a product, and as such the invention should not be limited to the provided examples. Product information refers to any information about a product. Examples include, but are not limited to: warranty information, purchase price, purchase data, payment method, vendor, return policies, and any other relevant information. Further, product information may also include information about a product gathered after the purchase of the product. Examples include, but are not limited to: product maintenance histories, locations of authorized service providers, purchaser notes about the product, resale information, any updated or changed information, and any other relevant information. It will be apparent to one of ordinary skill in the art that product information comprises any and all information relating to a product during its entire lifecycle, and as such, product information should not be limited to the examples provided above.

Figure 1:
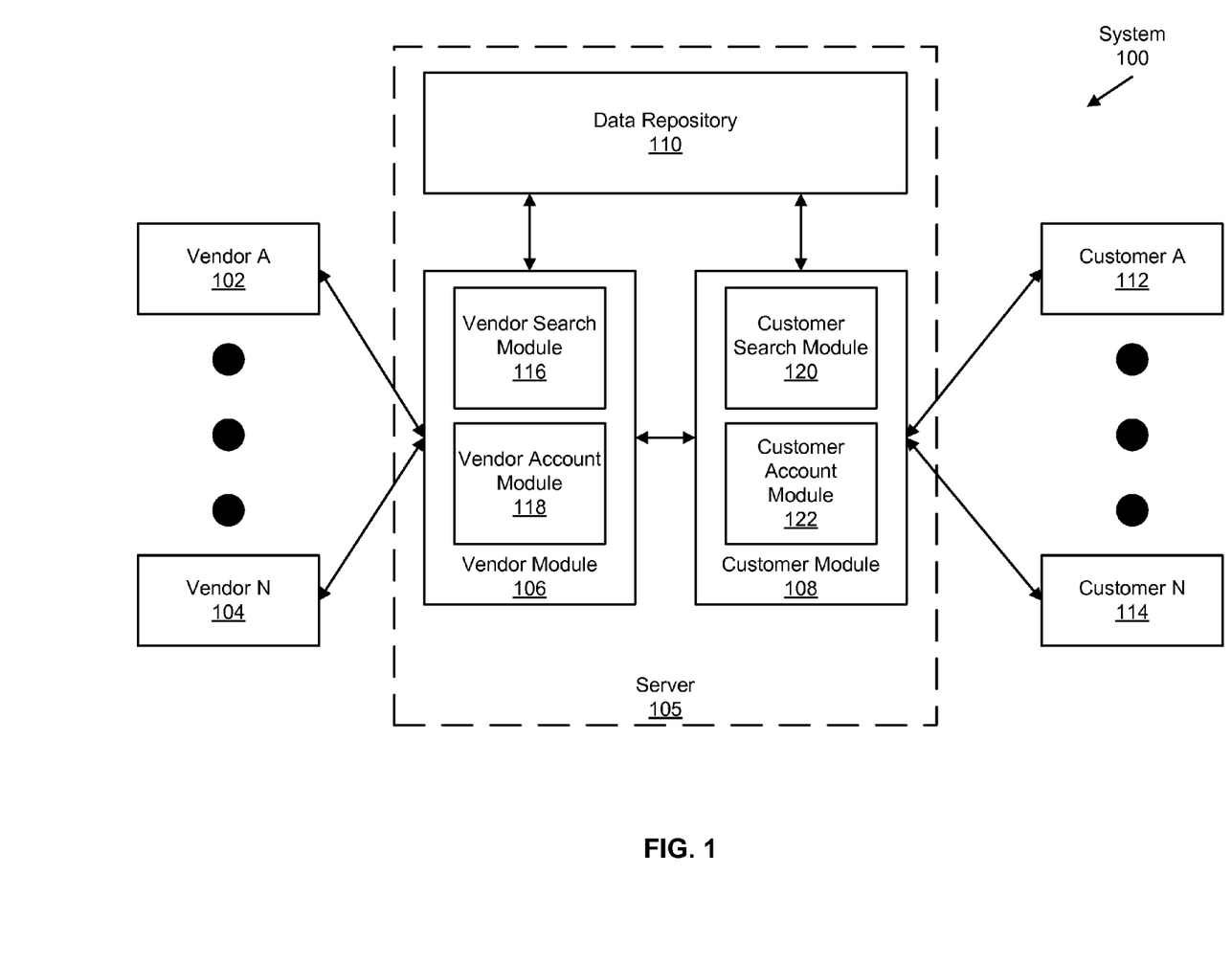
FIG. 1 shows a diagram of a system in accordance with one or more embodiments of the invention.

FIG. 1 shows a diagram of a system in accordance with one or more embodiments of the invention. As shown in FIG. 1, the system (100) includes vendors (i.e., vendor A (102) and vendor N (104)), a vendor module (106), a customer module (108), a data repository (110), and customers (i.e., customer A (112) and customer N (114)). Further, vendor module (106) includes a vendor search module (116) and vendor account module (118), and customer module (108) includes a customer search module (120) and a customer account module (122). Each of the aforementioned components of FIG. 1 is discussed below.

In one or more embodiments of the invention, the system (100) includes a server (105). The server (105) may be a physical or virtual server (or a combination thereof) that include functionality necessary to allow the data repository (110), the vendor module (106), and the customer module (108) to perform the operations described below. Further, in one or more embodiments of the invention, the server (105) may be similar to the computer system described in FIG. 4. In one or more embodiments of the invention, one skilled in the art will appreciate that the data repository (110), the vendor module (106), and the customer module (108) may be physically located on the same physical servers (as shown in FIG. 1) or may be distributed on different physical or virtual servers (not shown).

Vendor A (102) and vendor N (104) may be any person, organization, or entity that sells products. In one or more embodiments of the invention, the vendors (i.e., vendor A (102) and vendor N (104)) connect to the vendor module (106) via the internet using a wired or wireless connection. A vendor may use any device to connect to the vendor module (106) including but not limited to a computer, laptop, cell phone, personal digital assistant, and other such devices. It will be apparent to one of ordinary skill in the art that a vendor may be made of many agents (e.g., employees). In one or more embodiments of the invention, vendor A (102) and vendor N (104) may have specialized software installed at each of their point of sale terminals (not shown). In one or more embodiments of the invention, this software may automatically track all products sold, and transmit the product information to the vendor module (106) as soon as a purchase is completed. Alternatively, the product information may be transmitted to the vendor module at a later time (e.g., end of the day, end of the week, etc).

In one or more embodiments of the invention, the vendor module (106) includes a vendor search module (116) and a vendor account module (118). In one or more embodiments of the invention, the vendor module (106) is communicatively connected to the vendors (i.e., vendor A (102) and vendor N (104)), customer module (108) and the data repository (110). In one or more embodiments of the invention, the vendor module (106) may be a software application executing on a server (105) separate from the vendors (i.e., vendor A (102) and vendor N (104)). Alternatively, the vendor module (106) may be executing locally on a vendor computer (e.g., vendor A (102) and vendor N (104)). In one or more embodiments of the invention, the vendor module (106) may store any received information in the data repository (110).

In one or more embodiments of the invention, vendor account module (118) may register vendor accounts, receive purchased product information, store purchased product information, send reminders and handle other administrative tasks. A vendor (e.g., vendor A (102) and vendor N (104)) may register a vendor account by accessing the vendor account module (118). In one or more embodiments of the invention, this may be done through a web portal. Alternatively, a vendor account may be assigned to a vendor when the vendor pays for access to the system. In one or more embodiments of the invention, vendor account module (118) may communicate with customer module (108) to allow a vendor to provide a customer with a customer account, if the customer does not have one, at the time of purchase of a product. In one or more embodiments of the invention, vendor account module (118) may receive purchased product information from a vendor. In one or more embodiments of the invention, this information may be automatically sent at the time of purchase from a vendor to the registration module (118) using specialized software installed at point of sale terminals. Alternatively, this information may be manually entered by the vendor and sent at a later date.

In one or more embodiments of the invention, the vendor account module (118) may store received product information. This information may be stored in a data repository (110). In one or more embodiments of the invention, a data repository (110) may be on a separate computing device than vendor account module (118). Alternatively, data repository (110) may be on the same computing device, e.g., server (105), as vendor account module (118). In one or more embodiments of the invention, vendor account module (118) may send notices to the vendor. These notices may include, but are not limited to: customer feedback, reminders, warranty expiration notices and other notices. In one or more embodiments of the invention, vendor account module (118) may update product information. For example, if a vendor (i.e., vendor A (102) and vendor N (104)) retroactively changes a warranty for a product, registration module (118) may update that information in the data repository (110) in addition to transmitting a notification to the customer module (108), so that customers who have previously purchased the product may be notified.

In one or more embodiments of the invention, all stored information may be aggregated. The information may be aggregated by the vendor account module (118), the vendor module (106), customer account module (122), customer module (108), or any other module. In one or more embodiments of the invention, some information may not be included in the aggregated data. For example, private customer information, secret vendor business data, and other data may not be included. In one or more embodiments of the invention, when the data is aggregated it may be scrubbed to remove any identifying information.

In one or more embodiments of the invention, the vendor search module (116) may search stored data and the aggregated data and generate vendor reports. Vendor reports may be any report based off of product data stored by the system. For example, a vendor may request a report indicating how many televisions of Brand A were sold by the vendor over the past two months. Alternatively, a vendor may request a report on where customers who have purchased things at the vendor's store live, and what they purchased. The vendor may, for example, use this information to market their products more effectively. Additionally, vendor search module (106) may be able to generate reports based on data from customers, and/or generate the same reports that customers may generate. In one or more embodiments of the invention, vendor search module (116) may not be able to search private customer data. It will be apparent to one of ordinary skill in the art that a vendor may generate a report based on any data that the vendor module (106) can access, and as such, the invention should not be limited to the examples discussed above.

The customer module (108) includes customer search module (120) and customer account module (122). In one or more embodiments of the invention, customer module (108) is communicatively connected to the vendor module (106), the data repository (110) and the customers (i.e., customer A (112) and customer N (114)). The customer module (108) may be a software application executing on a server (e.g. server (105)) separate from the customers (i.e., customer A (112) and customer N (114)). The customer module (108) may be on a separate server (not shown) from the vendor module (106). Alternatively, the customer module (108) and the vendor module (106) may be the same software application executing on the same server (e.g. server (105)).

In one or more embodiments of the invention, the customer account module (122) has similar functionality to vendor account module (118). Customer account module (122) may be responsible for registering customer accounts. For example, a customer may register an account by accessing the customer account module (122) through the internet or other means of communication. Alternatively, a customer may receive an account automatically when they purchase a product from a vendor maintaining a vendor account. A customer account may be associated with many different vendors, thus, a customer needs to maintain only one account to access all of their purchased product information, regardless of what vendor the product was purchased from. In one or more embodiments of the invention, the customer account module (122) may be responsible for maintaining customer accounts, which may include storing purchased product information, tracking any updates to purchased products, sending notifications and reminders to the customer, and other activities. The customer account module (122) may be configured to automatically send warranty expiration notices, and other notices, to the customer for all products added to the customer account.

In one or more embodiments of the invention, the customer search module (120) may search product data, aggregated data, and generate reports for a customer. The customer search module (120) may include functionality similar to the vendor search module (116). The customer search module (120) may be able to generate a report showing how many televisions of Brand A and Brand B were returned within the first year of purchase. As another example, the customer search module (120) may be able to generate a report showing what the most popular product in a given category is. It will be apparent to one of ordinary skill in the art that the customer search module (120) may generate reports for any data that is accessible by the customer search module (120) and, as such, the invention should not be limited to the examples discussed above.

The data repository (110) may be any device capable of storing data. In one or more embodiments of the invention the data repository (110) may be on the same device (e.g. server (105)) as the vendor module (106) and the customer module (108). Alternatively, the data repository may be on a different device (not shown). Regardless, the data repository (110) is communicatively connected to both the vendor module (106) and the customer module (108) and is configured to at least store data of all types received from the modules. The data which is stored on the data repository (110) may be managed by the same data repository (110).

Customer A (112) and customer N (114) may be any person, organization, or entity that buys products from a vendor. In one or more embodiments of the invention, the customers (e.g., customer A (112) and customer N (114)) connect to the customer module (108) via the internet. A customer (e.g., customer A (112) and customer N (114)) may use any device to connect to the customer module (108) including but not limited to a computer, laptop, cell phone, personal digital assistant, and other such devices. It will be apparent to one of ordinary skill in the art that it may be possible for some vendors to also be customers, and for some customers to also be vendors, and as such, the invention should not be limited to one classification for any particular entity.

Figure 2A:
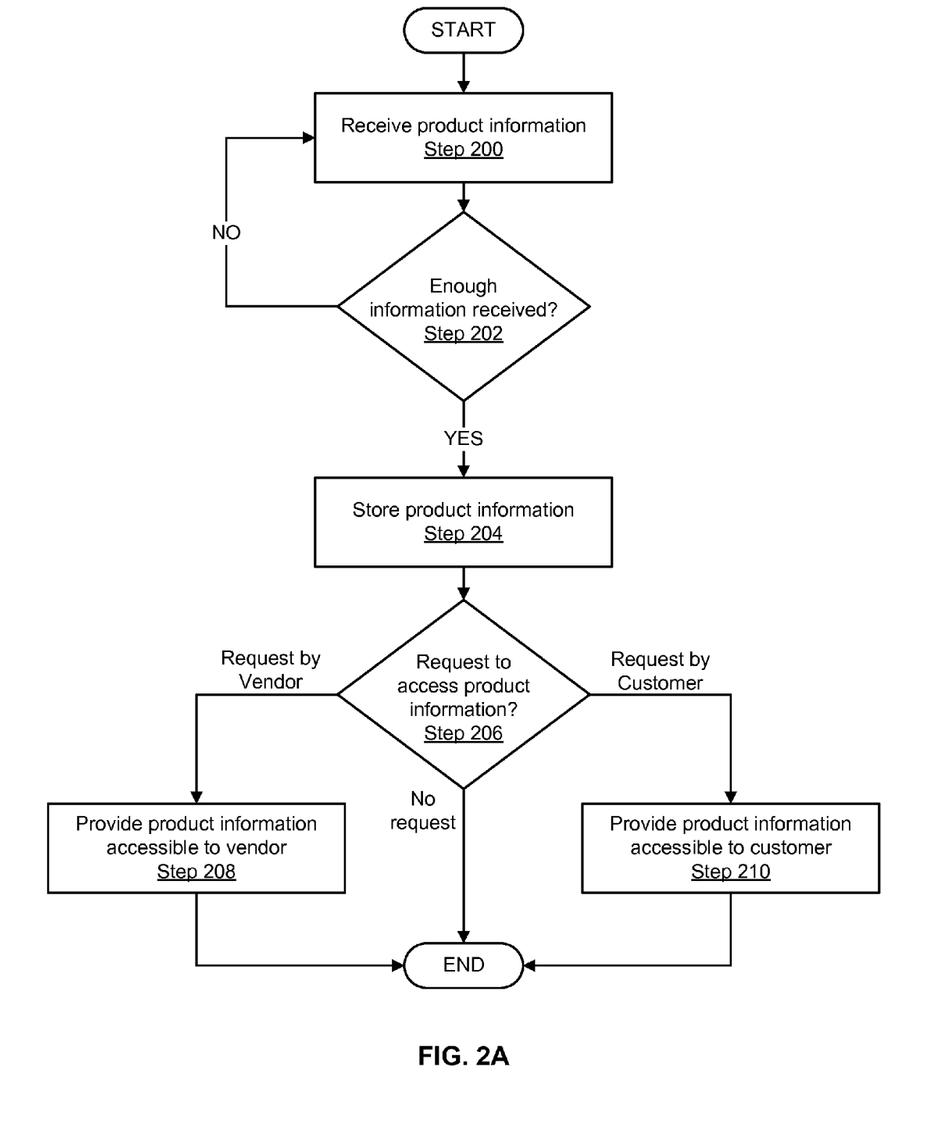
FIGS. 2A and 2B show flowcharts of a method in accordance with one or more embodiments of the invention.
Figure 2B:
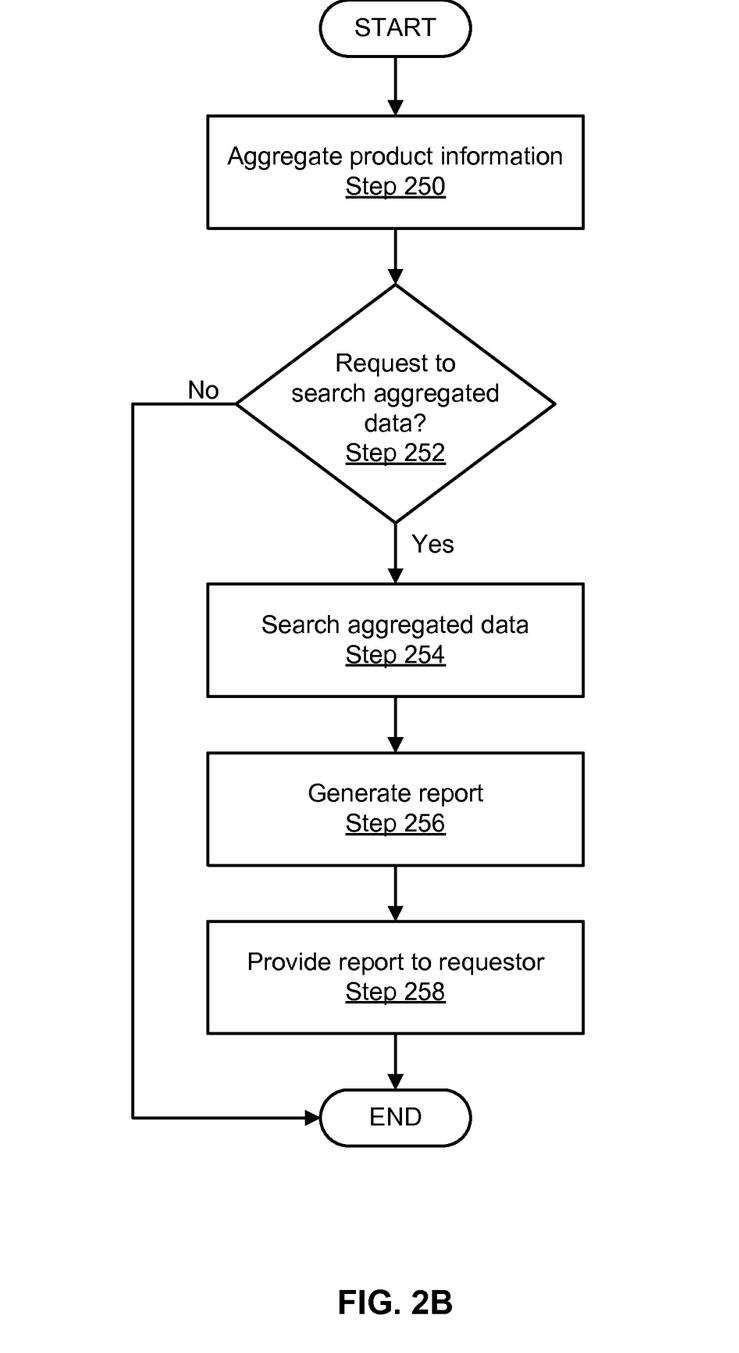

FIGS. 2A and 2B show flowcharts of a method in accordance with one or more embodiments of the invention. The method of FIGS. 2A and 2B may be implemented, for example, using the system of FIG. 1. In one or more embodiments of the invention, one or more of the steps shown in FIGS. 2A and 2B may be omitted, repeated, and/or performed in a different order than the order show in FIGS. 2A and 2B.

Accordingly, the scope of the invention should not be considered limited to the specific arrangement of steps shown in FIGS. 2A and 2B.

Prior to FIG. 2A, vendors may be registered in accordance with one or more embodiments of the invention. In one or more embodiments of the invention, registration may be performed by having the vendors sign up for an account at a website. Alternatively, vendors may be assigned an account when they pay for access to the system. In one or more embodiments of the invention, a vendor account may have multiple access levels and/or passwords. Thus, any given employee only has access to the information needed to do the employee's job. In one or more embodiments of the invention, a vendor account may contain information including, but not limited to, e-mail address, home address, names, phone numbers, warranty information, authorized service center locations, product purchase histories, and other relevant information.

Additionally, customer accounts may be registered. In one or more embodiments of the invention, a customer registers an account by visiting a website and signing up for one. Alternatively, a customer may be assigned an account by a vendor at the time of purchase of an item, if the customer does not currently possess an account. Alternatively, the registration may be accomplished by other methods known in the art. In one or more embodiments of the invention, a customer account may be associated with different vendor accounts as purchases are made. Alternatively, a customer may associate the account with a vendor manually, at any time.

In Step 200, information about a purchased product is received by the system. In one or more embodiments of the invention the information is received automatically from a point of sale terminal, at the time of purchase, using specialized software. Alternatively, the product information may be manually entered and sent to the system at a later date. It will be apparent to one of ordinary skill in the art that the product information may be added in many ways and as such, the invention should not be limited to the methods included here. In one or more embodiments of the invention, each product may be assigned a unique identifier. In one or more embodiments of the invention, the unique identifier may be a number or code, such as a serial number. Alternatively, the unique identifier may be assigned by the vendor at the time of purchase. The information received by the system may include, but is not limited to, purchase price, payment method, purchase date, purchase location, whether the product was on sale, warranty information, instruction manuals, customer information, licensed third party service centers, return policies, and any other relevant information. It will be apparent to one of ordinary skill in the art that all information relevant to a product after purchase will be stored in a single location, and that the information stored will be sufficient to enable a warranty claim to be filed.

In Step 202, a determination is made whether enough information has been received. If not enough information is received, then the method may request additional information and return to Step 200. If enough information is received, then the method proceeds to Step 204.

In Step 204, the received product information is stored in a data repository. In one or more embodiments of the invention, the product information (in the form of various types of data) is associated with its corresponding accounts (i.e., a customer account and a vendor account) at the time it is stored.

In Step 206, a determined is made whether a request to access information is received, and who is requesting the information. If no request is made to access information within the account, the method ends. If a request is received from a vendor account, then the method proceeds to Step 208. If a request is received from a customer account, then the method proceeds to Step 210. The information requested may be in the form of any information within the account or information in a report.

In Step 208, the requested information is provided to the requesting vendor account. In one or more embodiments of the invention, the vendor is only able to request information about products sold in the vendor's store (i.e. restricted access to only products sold in the vendor's store using the vendor's account). Alternatively, the vendor may be able to request information about products not sold in the vendor's store. In one or more embodiments of the invention, products sold from the vendor's store may have much more detailed and private information associated with them. The information may be provided to the requestor in the form of an e-mail, webpage, text message, picture, phone call, postal mail, or any other applicable format. It will be apparent to one of ordinary skill in the art that the vendor account may have restrictions on what data the vendor can access and, as such, the invention should not be limited to the examples provided above.

In Step 210, the requested information is provided to the requesting customer account. In one or more embodiments of the invention, the customer is only able to request information about products bought by the customer (i.e. restricted access to only products bought by the customer at any vendor using the customer's account). Alternatively, the customer may be able to request information about other products. In one or more embodiments of the invention, products bought by the customer may have much more detailed and private information associated with the product. The information may be provided to the requestor in the form of an e-mail, webpage, text message, picture, phone call, postal mail, or any other applicable format. It will be apparent to one of ordinary skill in the art that the customer account may have restrictions on what data the customer can access and as such, the invention should not be limited to the examples provided above.

As an optional step (not shown in FIG. 2A), reminders and/or notifications related to stored product information may be sent. In one or more embodiments of the invention, the reminder may be sent to contact information stored in the customer or vendor account. In one or more embodiments of the invention, the reminders and/or notifications may be sent at predetermined service dates. Alternatively, the reminders may be sent at the request of a customer or a vendor. In one or more embodiments of the invention, the reminders may be sent through e-mail. Alternatively, the reminders may be sent through the postal service, on the telephone, or through any other means of communications. In one or more embodiments of the invention, the reminder/notification may contain any relevant information including, but not limited to change in warranty terms, warranty expiration warning, service date, store opening/closing notice, etc. In one or more embodiments of the invention, reminders and/or notifications may be sent to a vendor account in any of the same ways that a reminder or notification may be sent to a customer account.

As another optional step (not shown in FIG. 2A), it may be determined whether a request to update information is received. If a request is received, product and/or customer information is updated. It will be apparent to one of ordinary skill in the art that not all information may be updated. Things that may not be updated include, but are not limited to, product information such as the date of purchase, price, and other static information. However, other information may be updated including, but not limited to, contact information and product information such as service histories or product ownership. For example, a product may be sold from one customer to another, and the account information may be updated to reflect that. Alternatively, if a product underwent service or maintenance a report related to that service or maintenance may be added to the account(s). It will be apparent to one of ordinary skill in the art that this is not an exhaustive list of the information that may or may not be updated, and as such, should not limit the invention to the examples described above. Also, it will be apparent to one of ordinary skill in the art that both the customer and vendor is able to update information.

Turning to FIG. 2B, in Step 250, stored product information is aggregated. In one or more embodiments of the invention, other information may also be aggregated, such as customer information. In one or more embodiments of the invention, private information may be scrubbed before aggregation. It will be apparent to one of ordinary skill in the art that any information stored by the system may be aggregated and, as such, the invention should not be limited to the examples discussed above. In one or more embodiments of the invention, the aggregated data may be organized into categories that allow for comparisons and searches between different products.

In Step 252, a determination is made whether a request to search the aggregated data is received. If no such request was received, the method ends. If such a request is received, the method proceeds to Step 254. In one or more embodiments of the invention, the request may come from either a customer account or a vendor account. In one or more embodiments of the invention, the request may be for any data that is available for searching.

In Step 254, a search is performed on the aggregated data. A search may be performed on any data accessible by an account; however, any restrictions that apply to the requestor may be enforced. Accordingly, if the requestor is a vendor, the search may be limited only to the types of products sold by the vendor or other configurable restrictions described above. Likewise, if the requestor is a customer, the search may be limited only to the types of products purchased (or not purchased) by the customer or other configurable restrictions described above. In one or more embodiments of the invention, information that has not been aggregated may also be searched. It should be apparent to one of ordinary skill in the art that both vendor accounts and customer accounts allow for search functionality.

In Step 256, the search is used to generate a report. In one or more embodiments of the invention, a report may be generated via a vendor or customer account. In one or more embodiments of the invention, comparisons may be made between categories/classifications. For example, a user could compare Brand A to Brand B. Similarly, a user could compare LCD televisions to plasma televisions. It will be apparent to one of ordinary skill in the art that many comparisons may be made, and that the invention should not be limited to the examples described above.

It will be apparent to one of ordinary skill in the art that many different types of information may be compared and/or reported. For example, a customer or vendor may want to know what television model needs the fewest repairs. To answer that, a report may be generated showing the average number of warranty-related repairs performed on a predetermined selection of Televisions. Alternatively, a vendor or customer may compare the volume of Televisions sold by brand, or by time period. Some reports may be accessible only to a specific vendor or only to a specific customer. For example, a vendor may be able to generate a report with all products sold over the past month by the vendor. However, a different vendor may not be able to generate a report containing all the products sold over the past month by a competitor. It will be apparent to one of ordinary skill in the art that many different data items may be compared or reported on, and as such, the invention should not be limited by the examples described above. Further, it will be apparent to one of ordinary skill in the art that generating a report provides empirical data about products. After generating a report, the method ends.

It will be apparent to one of ordinary skill in the art that there are many different ways to charge a fee for the service(s) provided by the present invention and the invention should not be limited to the examples below. In one or more embodiments of the invention, vendors may be charged a recurring (e.g., monthly, quarterly, yearly) fee. Alternatively, vendors may be charged a one time fee. In another embodiment of the invention, customers may be charged a recurring and/or one time fee. In another embodiment of the invention, a fee may be charged for generating a report, or a vendor/customer may sign up for a certain amount of reports per month.

In Step 258, the report is provided to the requestor. The report may be provided to the requestor in any readable format. For example, the report may be provided in the form of an e-mail, webpage, text message, picture, phone call, postal mail, or any other format.

Figure 3A:
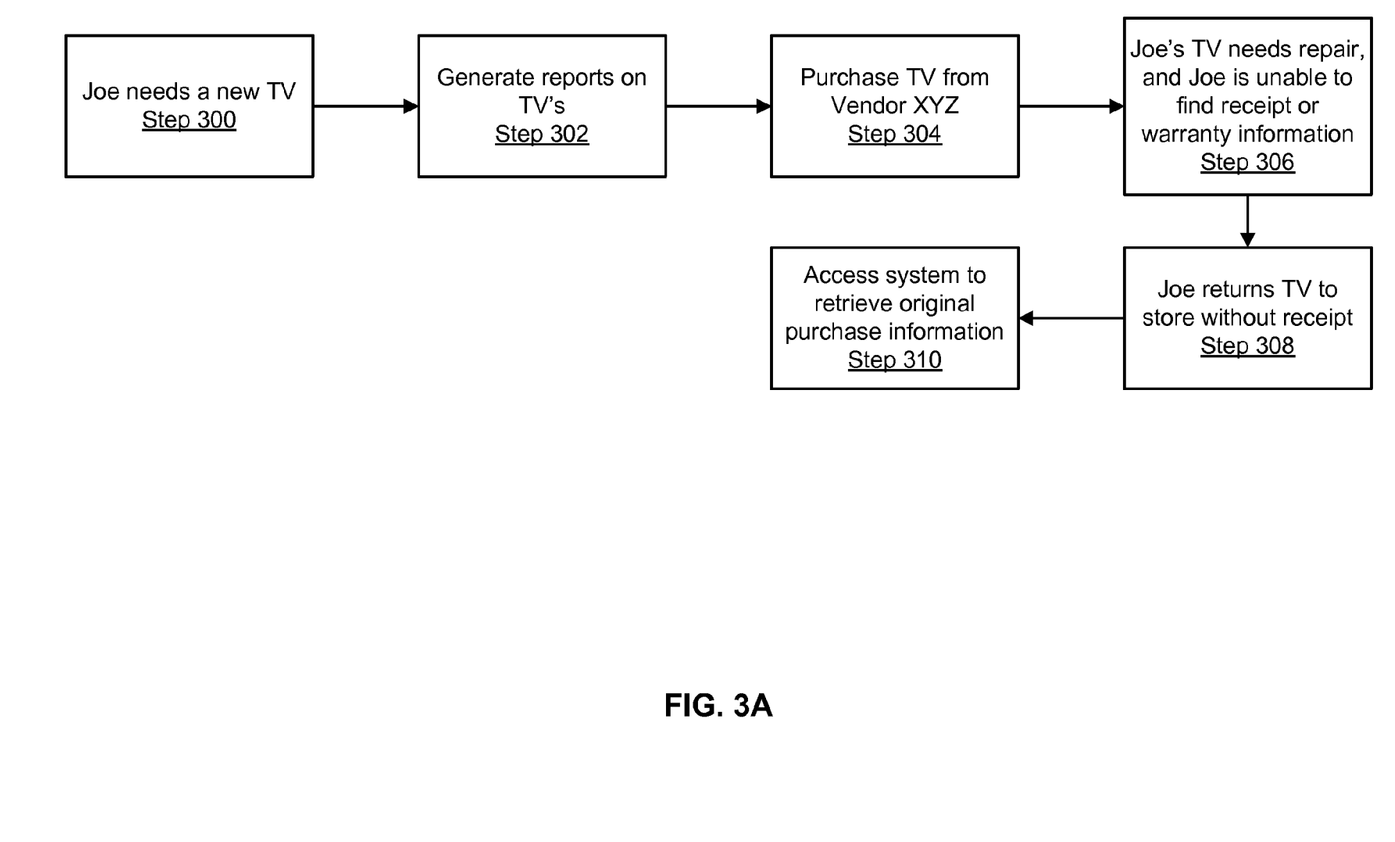
FIGS. 3A and 3B show a dataflow diagram in accordance with one or more embodiments of the invention.
Figure 3B:
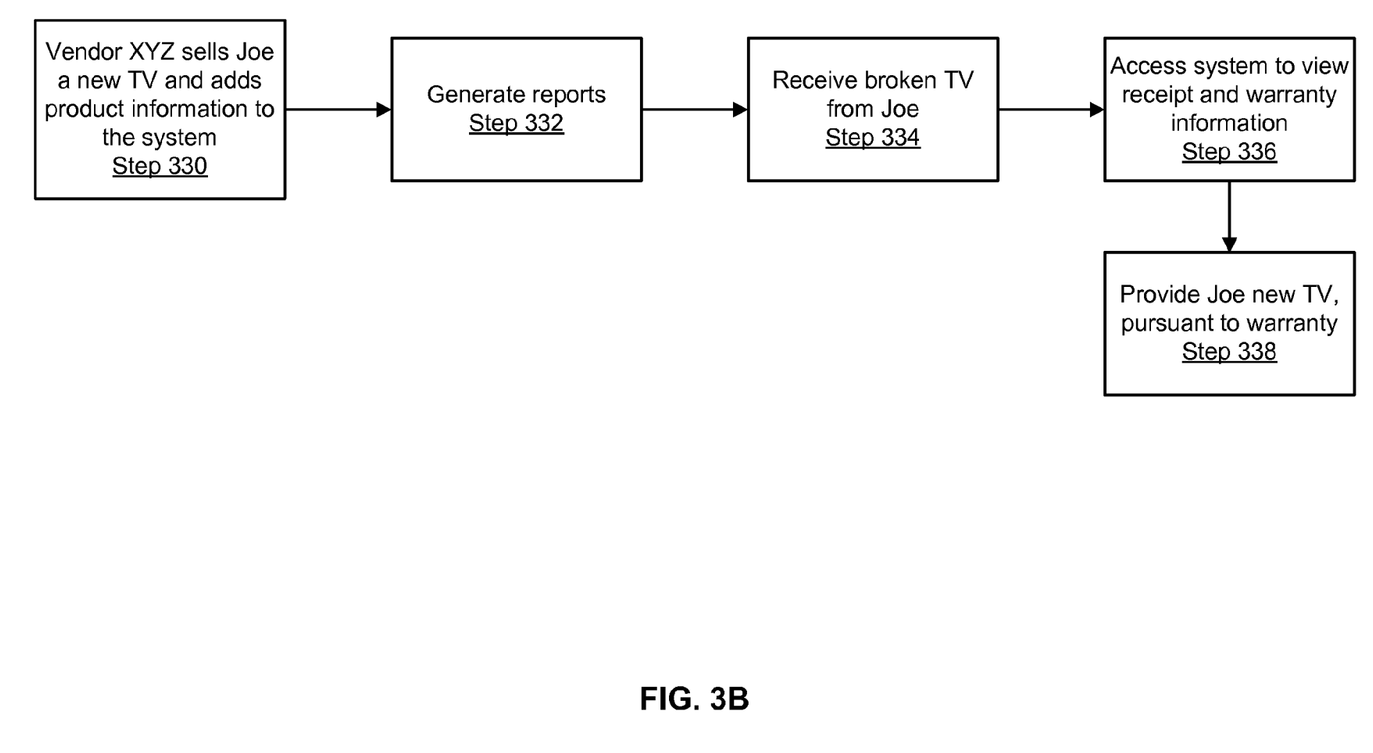

As an example of how the invention may be applied, consider the following examples shown as dataflow diagrams in FIGS. 3A and 3B. It will be apparent to one of ordinary skill in the art that the invention may be applied in a variety of ways and in a variety of situations and, as such, should not be limited to the following examples.

In FIG. 3A, an example of how the invention may be used is shown as a dataflow diagram from a customer perspective. The example involves, a customer, namely Joe, and a vendor, namely Vendor XYZ. In Step 300, Joe decides that he needs a new television because his current one is very old. Because a new television is a large investment, Joe decide to do some research into what type and brand of television he should purchase. While reading an online review of television brands, Joe realizes that he is unsure whether he can trust the accuracy of the review—Joe does not personally know the reviewer, and refuses to blindly trust the reviewer's judgment. For Joe, the reviews would be much more useful if the reviews (and/or reviewers) had empirical data to back them up.

Luckily for Joe, he has a customer account with a system of the present invention that allows him to access large amounts of empirical data for a variety of products. Accordingly, in Step 302, Joe logs onto his customer account and begins to generate reports. First, Joe may generate reports showing how many Televisions of Type A and Type B were purchased over the past year, and how many were returned under warranty. Through this report, Joe can determine the most popular and most reliable type of television. Next, Joe may generate reports about television brands. With this empirical data to back up other reviews Joe has read, Joe makes a decision that he will purchase a television of Type A made by Brand A.

Accordingly, in Step 304, Joe visits his favorite electronics store, Vendor XYZ, and purchases his desired television. While at the point of sale terminal, an employee of Vendor XYZ asks Joe whether he would like to register as a customer with the system, so that he may more easily access information on products he purchases. Joe informs the employee that he already registered for an account, and provides the employee his account information. Using that information, the employee is able to send the product information about Joe's newly purchased television to his customer account.

Within the next year, Joe's television breaks (Step 306). Unfortunately, after much searching, Joe is unable to find a receipt or warranty information for his television. Because Joe previously attempted to return items to Vendor XYZ, Joe knows that he must possess his receipt for the vendor to satisfactorily return an item for replacement or receive reimbursed warranty work. However, Joe remembers his customer account and that both he and Vendor XYZ are able to access the information that was recorded at the time of television purchase earlier that year. Therefore, Joe brings his television back to Vendor XYZ (Step 308). At Vendor XYZ, Joe informs the employee assisting him that he doesn't have his receipt, but that it is stored in the system. The employee is able to access the system and retrieve all the information that was stored at the time of the original purchase (Step 310). This way, the employee is able to retrieve and verify the purchase, as well as information Joe that his television is still covered under the store's or manufacturers warranty policy. Thus, Joe receives a new television to replace the broken one.

FIG. 3B also shows a dataflow diagram showing the same situation as described above, but from the viewpoint of Vendor XYZ. Initially, Vendor XYZ sells Joe a new television to a customer, and enters the product information into the vendor account of the system at the time of purchase (Step 330). The product information may be entered automatically by the point of sale terminal or, alternatively, may be manually entered by an employee accessing the vendor account. Later, Vendor XYZ may generate reports using the system (Step 332). For example, Vendor XYZ may generate reports such as how many televisions were sold during the year, where customers live, reliability data, or other reports using the data within the system. Later in the year, Joe attempts to return his television back to Vendor XYZ because it has broken so the vendor receives the broken television from Joe (Step 334). Joe could not find the receipt, but that isn't a problem because Vendor XYZ stores all purchase information in the vendor account of the system. Accordingly, an employee of Vendor XYZ accesses the vendor account to view the original purchase information as well as the warranty information (Step 336). Based on the information, Vendor XYZ accepts the return of the broken television, and provides Joe with a new television, pursuant to the terms of the warranty (Step 338).

It will be apparent to one of ordinary skill in the art that this is but one example of how the invention may work, and that there are many other ways to use the invention. Accordingly, the invention should not be limited to the example described above.

Figure 4:
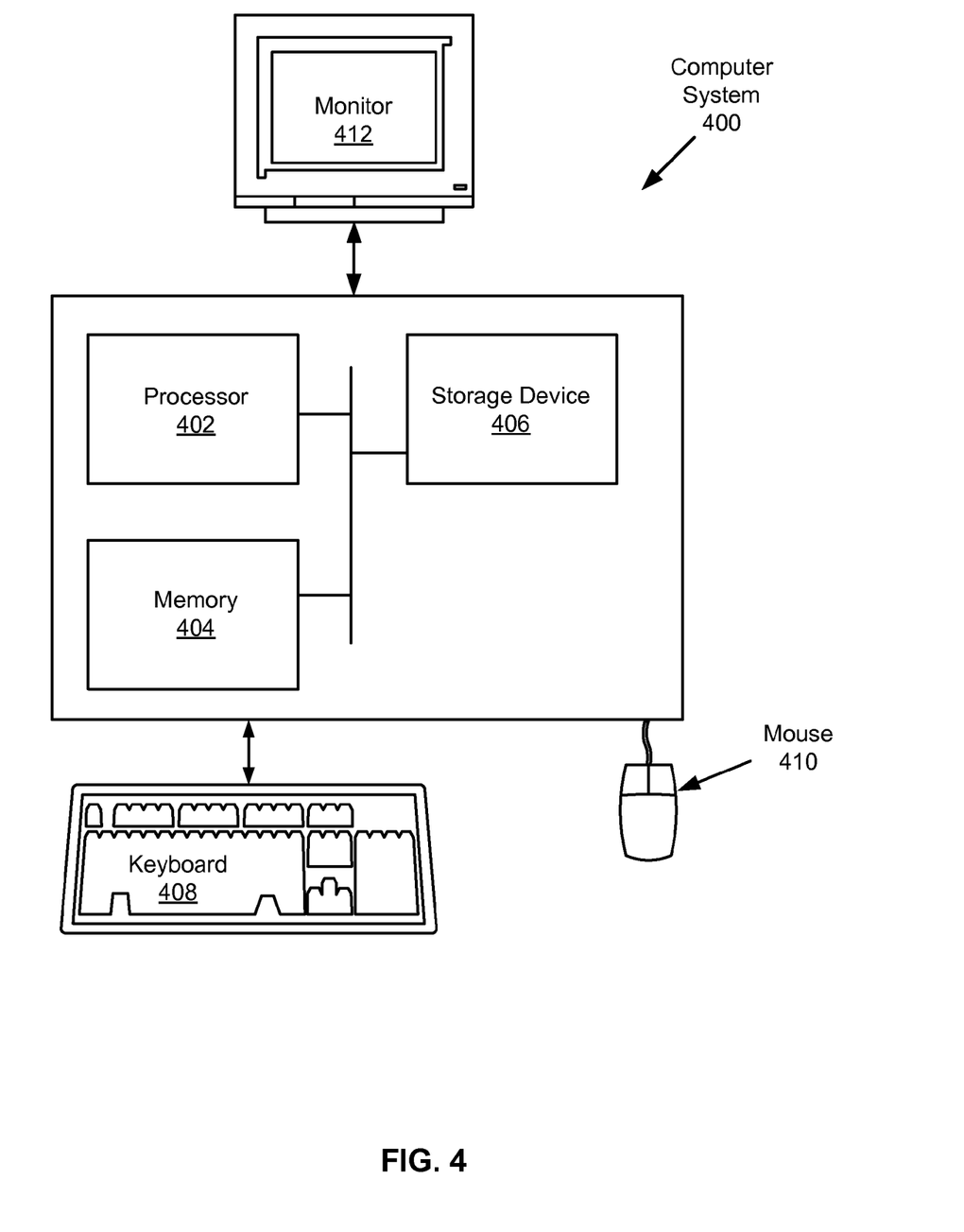
FIG. 4 shows a diagram of a computer system in accordance with one or more embodiments of the invention.

The invention may be implemented on virtually any type of computing device regardless of the platform being used. For example, as shown in FIG. 3, a computer system (400) includes a computer processor (402) (such as a central processing unit) configured to execute instructions, associated memory (404) configured to store instructions (typically for a limited duration), a storage device (406), and numerous other elements and functionalities typical of today's computers (not shown). The computer system (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms, now known or later developed.

The computer system (400) is particularized to perform the functionality of the method described above, such as receiving warranty information associated with a first product from a first vendor of a plurality of vendors, receiving warranty information associated with a second product purchased by the customer from a second vendor of the plurality of vendors, storing the warranty information associated with the first product to a customer account associated with the customer and a first vendor account associated with the first vendor, storing the warranty information associated with the second product to the customer account and a second vendor account associated with the second vendor, receiving a request to access warranty information, and providing warranty information pursuant to the request.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable storage medium such as a compact disc (CD), a diskette, a tape, or any other suitable tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for product life cycle maintenance comprising:
   receiving a first warranty information associated with a first product from a first vendor of a plurality of vendors, wherein the first product is purchased by a customer, and wherein the first warranty information is received from the first vendor and is sufficient to file a warranty claim;
   receiving a second warranty information associated with a second product purchased by the customer from a second vendor of the plurality of vendors, wherein the second warranty information is received from the second vendor and is sufficient to file a claim;
   storing, by a computer processor, the first warranty information associated with the first product in a data repository;
   associating, in the data repository and by the computer processor, the first warranty information with a customer account of the customer and a first vendor account of the first vendor,
      wherein the customer returns the first product to the first vendor after purchasing the first product, and
      wherein the first product has a defect covered by the first warranty information;
   storing, by the computer processor, the second warranty information associated with the second product in the data repository;
   associating, in the data repository and by the computer processor, the second warranty information with the customer account of the customer and a second vendor account of the second vendor;
   receiving, after the customer has returned the first product to the first vendor, a first request from the first vendor to access the first warranty information; and providing the first warranty information to the first vendor pursuant to the first request, wherein the first vendor uses the first warranty information to submit the warranty claim to a warranty provider of the first product.

2. The method of claim 1, further comprising:
receiving product information associated with a plurality of products from the customer and the plurality of vendors;
aggregating the product information associated with the plurality of products to create aggregated data;
receiving a second request to search the aggregated data;
searching the aggregated data pursuant to the second request; and
providing a result of the search to a requestor.

3. The method of claim 2 further comprising:
scrubbing private data from the product information prior to aggregating.

4. The method of claim 2, wherein the second request to search the aggregated data is from the customer.

5. The method of claim 2, further comprising:
generating a report using the result of the search, wherein the report comprises a comparison.

6. The method of claim 1, further comprising:
receiving, after storing the first warranty information, additional warranty information associated with the first product;
storing the additional warranty information in the data repository; and
associating, in the data repository, the additional warranty information with the customer account of the customer and the first vendor account of the first vendor.

7. The method of claim 1, wherein the first warranty information associated with the first product is received from a Point of Sale (POS) terminal.

8. A computer readable storage medium encoded with instructions for product life cycle maintenance, the instructions comprising functionality to:
receive a first warranty information associated with a first product from a first vendor of a plurality of vendors, wherein the first product is purchased by a customer, and wherein the first warranty information is received from the first vendor and is sufficient to file a claim;
receive a second warranty information associated with a second product purchased by the customer from a second vendor of the plurality of vendors, wherein the second warranty information is received from the second vendor and is sufficient to file a warranty claim;
store the first warranty information associated with the first product in a data repository;
associate, in the data repository, the first warranty information with a customer account of the customer and a first vendor account of the first vendor,
wherein the customer returns the first product to the first vendor after purchasing the first product, and
wherein the first product has a defect covered by the first warranty information;
store the second warranty information associated with the second product in the data repository;
associate, in the data repository, the second warranty information with the customer account of the customer and a second vendor account of the second vendor;
receive, after the customer has returned the first product to the first vendor, a first request from the first vendor to access the first warranty information; and
provide the first warranty information to the first vendor pursuant to the first request, wherein the first vendor uses the first warranty information to submit the warranty claim to a warranty provider of the first product.

9. The computer readable storage medium of claim 8, wherein the instructions further comprise functionality to:
receive product information associated with a plurality of products from the customer and the plurality of vendors;
aggregate the product information associated with the plurality of products to create aggregated data;
receive a second request to search the aggregated data;
search the aggregated data pursuant to the second request; and
provide a result of the search to a requestor.

10. The computer readable storage medium of claim 9, wherein the instructions further comprise functionality to:
scrub private data from the product information prior to aggregating.

11. The computer readable storage medium of claim 9, wherein the second request to search the aggregated data is from the customer.

12. The computer readable storage medium of claim 9, wherein the instructions further comprise functionality to:
generate a report using the result of the search, wherein the report comprises a comparison.

13. The computer readable storage medium of claim 8, wherein the instructions further comprise functionality to:
receive, after storing the first warranty information, additional warranty information associated with the first product;
store the additional warranty information in the data repository; and
associate, in the data repository, the additional warranty information with the customer account of the customer and the first vendor account of the first vendor.

14. The computer readable storage medium of claim 8, wherein the first warranty information associated with the first product is received from a Point of Sale (POS) terminal.

15. A computer system for product life cycle maintenance comprising:
a computer processor;
a data repository communicatively connected to a vendor module and comprising:
a first warranty information associated with a first product, and
a second warranty information associated with a second product; and
the vendor module executing on the computer processor and configured to:
receive the first warranty information associated with the first product from a first vendor of a plurality of vendors, wherein the first product is purchased by a customer, and wherein the first warranty information is received from the first vendor and is sufficient to file a warranty claim;
receive the second warranty information associated with the second product purchased by the customer from a second vendor of the plurality of vendors, wherein the second warranty information is received from the second vendor and is sufficient to file a claim;
store, in the data repository, the first warranty information associated with the first product;
associate, in the data repository, the first warranty information with a customer account of the customer and a first vendor account of the first vendor,
wherein the customer returns the first product to the first vendor after purchasing the first product, and
wherein the first product has a defect covered by the first warranty information;

store, in the data repository, the second warranty information associated with the second product;

associate, in the data repository, the second warranty information with the customer account of the customer and a second vendor account of the second vendor;

receive, after the customer has returned the first product to the first vendor, a first request from the first vendor to access the first warranty information; and provide the first warranty information to the first vendor pursuant to the first request, wherein the first vendor uses the first warranty information to submit the warranty claim to a warranty provider of the first product.

16. The computer system of claim 15, further comprising: a customer module configured to:

receive product information associated with a plurality of products from the customer;

aggregate the product information associated with the plurality of products to create aggregated data;

receive a second request to search the aggregated data;

search the aggregated data pursuant to the second request; and provide a result of the search to a requestor.

17. The computer system of claim 16, wherein the customer module is further configured to:

scrub private data from the product information prior to aggregating.

18. The computer system of claim 16, wherein the second request to search the aggregated data is from the customer.

19. The computer system of claim 16, wherein the customer module is further configured to:

generate a report using the result of the search, wherein the report comprises a comparison.

20. The computer system of claim 15, wherein the first warranty information associated with the first product is received from a Point of Sale (POS) terminal.

* * * * *